United States Patent [19]

Leonard et al.

[11] 4,189,165

[45] Feb. 19, 1980

[54] MUD-FLAP SUPPORTING ASSEMBLY

[76] Inventors: Charles F. Leonard, Box 99, Rte. 1; Claude H. Leonard, Box 127, both of Star, Id. 83669

[21] Appl. No.: 869,761

[22] Filed: Jan. 16, 1978

[51] Int. Cl.$^2$ ............................................... B62B 9/16
[52] U.S. Cl. .......................... 280/154.5 R; 248/289 A
[58] Field of Search ................ 280/154.5 R; 248/204, 248/289 A, 145, 475 B, 584, 599; 403/111

[56] References Cited

U.S. PATENT DOCUMENTS 4,007,944   2/1977   Dingess .......................... 280/154.5 R Primary Examiner—Albert J. Makay
Assistant Examiner—Edmond G. Rishell, Jr.
Attorney, Agent, or Firm—Cushman, Darby & Cushman

[57] ABSTRACT

A mud-flap supporting assembly is provided that allows pivotal movement of a mud flap mounting arm about a vertical axis adjacent to the vehicle to which the arm is mounted, but prevents movement of the arm in a vertical direction. A vertical pin passes through an arm portion and a support portion to define the vertical axis about which the mounting arm is pivoted, and a spring is operatively connected between the arm and arm portion for centering the arm so that it is normally in intermediate position but may pivot against the spring bias about the vertical axis out of the intermediate position yet will be automatically returned by the spring to the intermediate position. The arm may be mounted so that it is horizontally movable with respect to the arm portion; or the arm and arm portion may be fixed together and a pair of pivotal levers mounted to the arm portion which are engaged by the spring.

12 Claims, 7 Drawing Figures

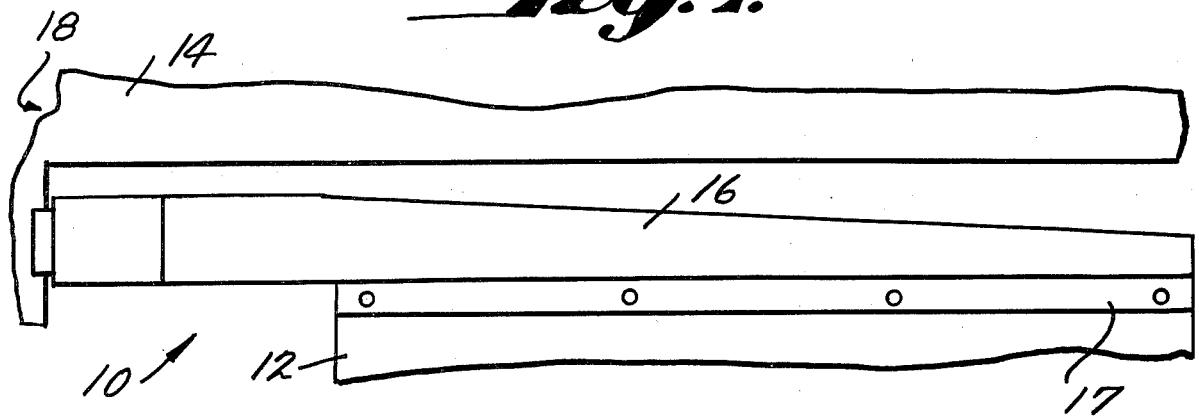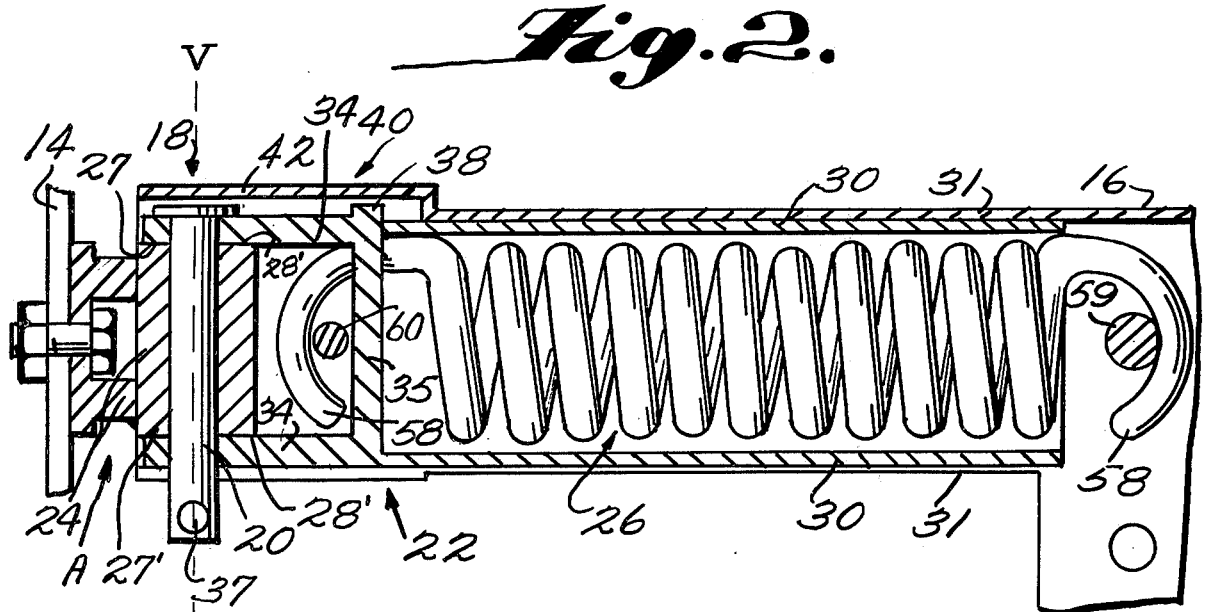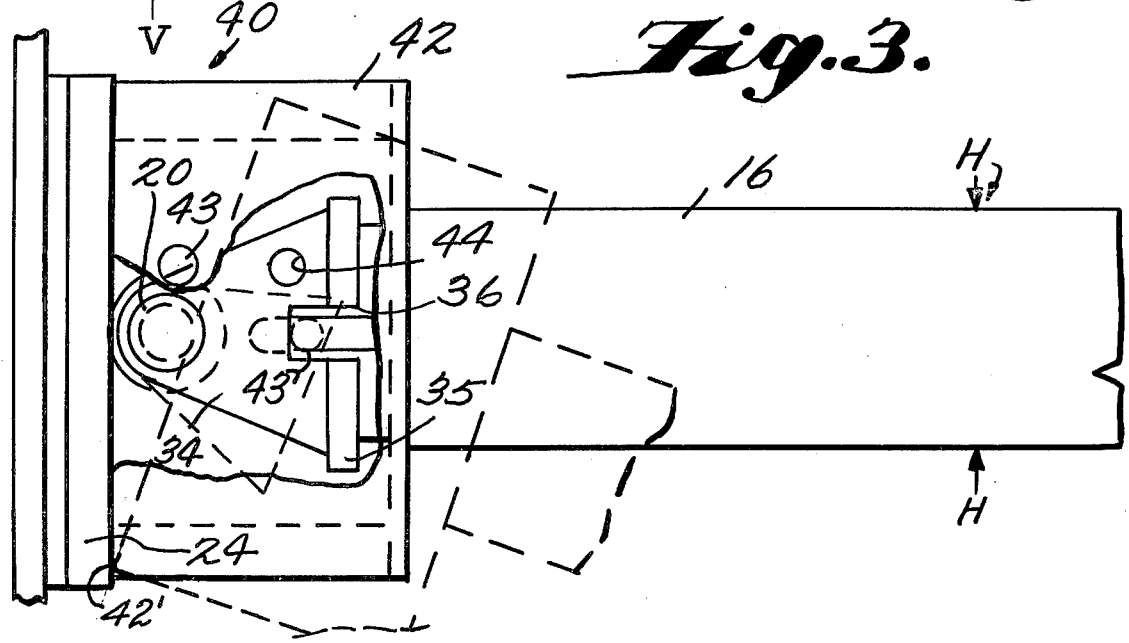

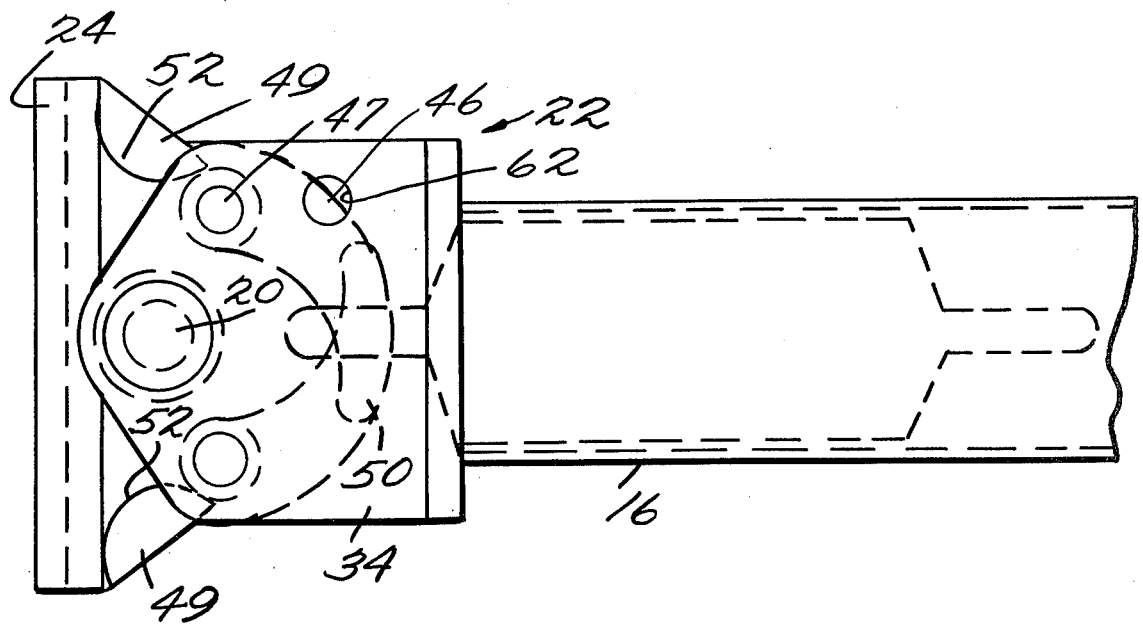
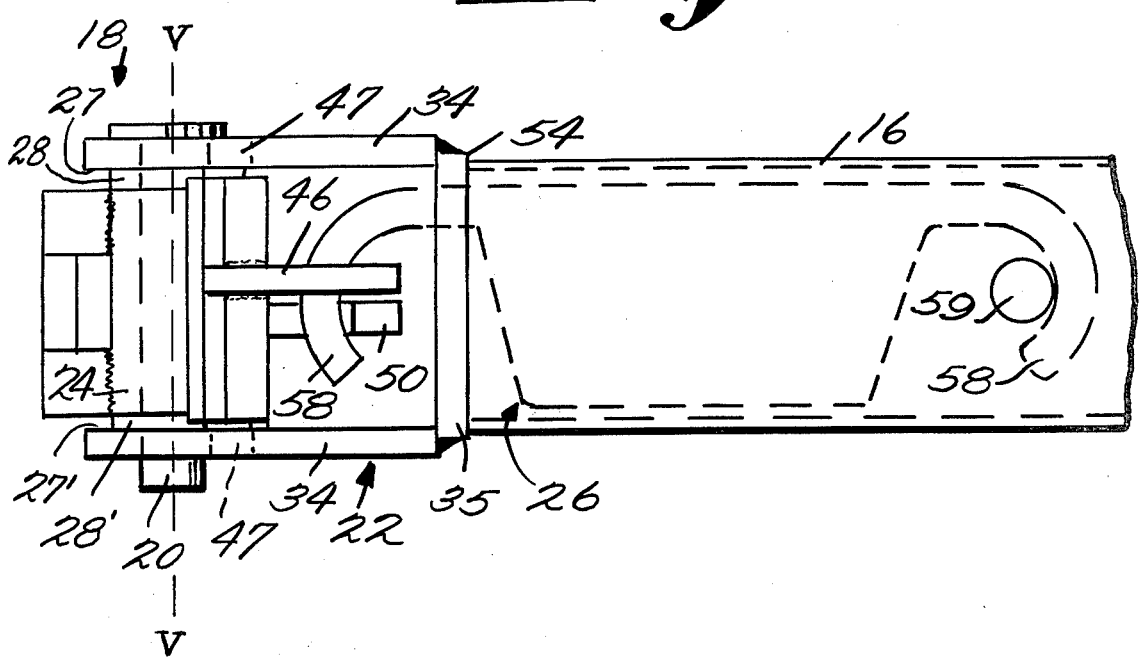

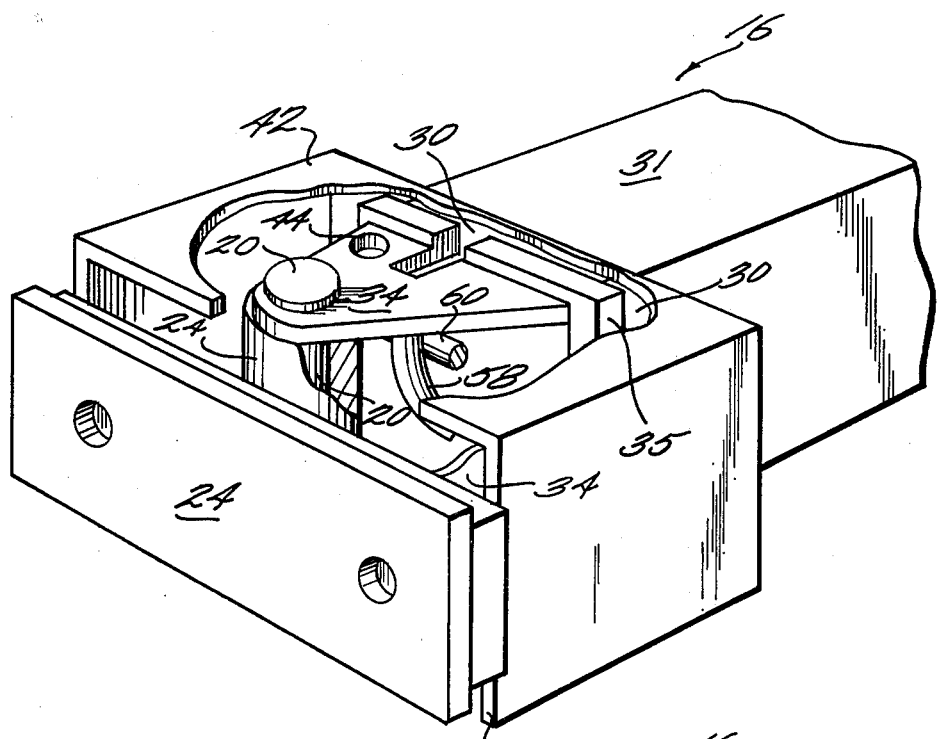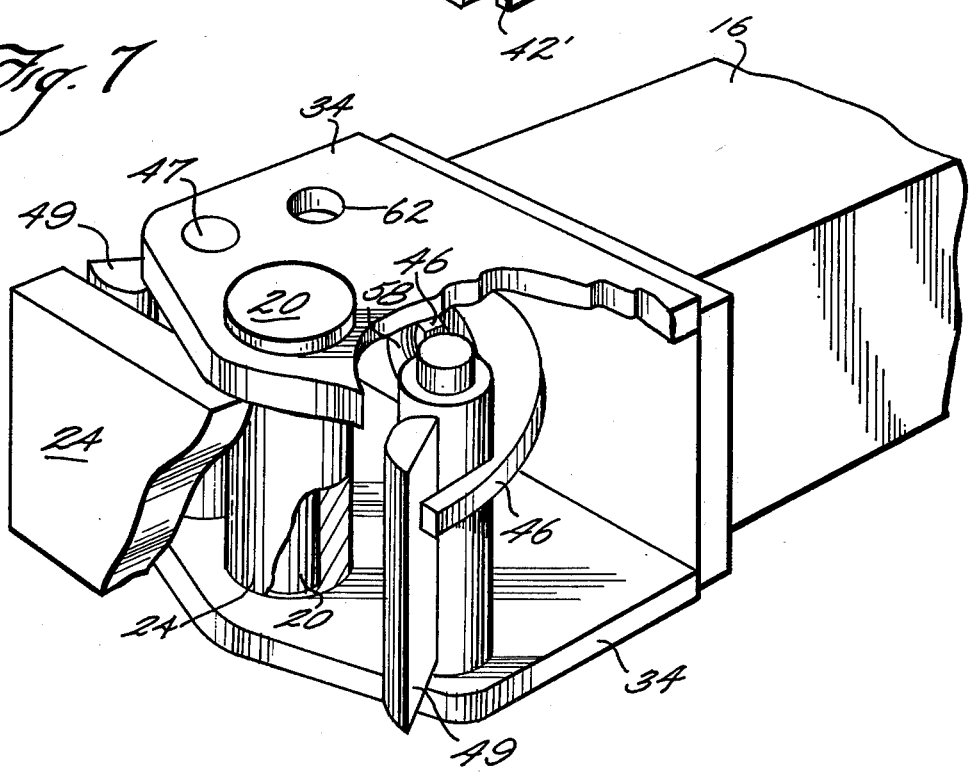

MUD-FLAP SUPPORTING ASSEMBLY

BACKGROUND AND SUMMARY OF THE INVENTION

In the past there have been many proposals for the provision of spring loaded arms for mounting a mud-flap on a truck or the like. While such structures have in general been quite useful for logging trucks, in highway situations there have been some disadvantages associated with the general prior art structures. Such prior art structures, as exemplified by U.S. Pat. Nos. 2,652,266 and 2,801,867, have provided for up-and-down movement of the mud-flap in addition to pivotal movement about a vertical axis. When mud or the like builds up on the mud-flaps, however, they have a tendency to droop due to the ability to move up and down, and therefore they do not maintain a constant vertical relationship with respect to the wheel. Also, there is a tendency in such prior art structures for the flaps to bounce and shake when the vehicle to which they are attached goes over small bumps in the road, which bouncing and shaking under some circumstances can have an effect on the life of the flaps.

According to the present invention a mud-flap supporting assembly is provided for mounting a mud-flap on the vehicle which is eminently suited for use in highway situations. According to the present invention the assembly comprises a horizontally disposed mounting arm adapted to have a mud-flap attached thereto, and means for mounting the mounting arm to a vehicle at an attachment point including means for substantially preventing movement of the arm in a vertical direction, and means for allowing pivotal movement of the arm about a vertical axis adjacent the operative attachment point of the arm to the vehicle. The means for allowing pivotal movement of the arm about a vertical axis includes a vertical pin, an arm portion for receiving the pin, and a support portion adapted to be connected to the vehicle for receipt of said pin, the pin passing through the arm portion and the support portion. Additionally, spring means operatively connected between the arm and arm portion for centering the arm are provided, so that the arm is normally in the first position but may pivot against the spring bias about the vertical axis out of the first position, and so that it will be automatically returned by the spring biasing means to the first position. The means for preventing movement of the arm in a vertical direction may comprise interfering portions of the arm portion and the support portion, and the spring means preferably comprises a coil spring having hook-shaped end portions.

The two preferred assemblies according to the present invention may be removed without a hammer or other special tools, and the springs associated therewith may be readily replaced. According to a first embodiment of the invention, the means for preventing vertical movement of the arm also comprises means for mounting the arm for horizontal telescopic movement thereof with respect to the arm portion against the bias of the spring means. Stop means are provided for preventing complete separation of the arm from the arm portion should the spring means break, and arm portion preferably includes a yoke having a pair of arms and a cross portion. The cross portion has a slot form therein for passage of a portion of the spring means into the area between the yoke arms, and the yoke arms have vertically aligned bores for receipt of the vertical pin. The means for allowing pivotal movement of the arm above the vertical axis further comprises a terminating portion of the arm biased into engagement with a portion of the support portion by the spring biasing means, the arm terminating portion comprising a top plate portion that covers the vertical pin in the first position of the arm, but which does not cover the vertical pin when the arm is pivoted away from the first position, a pair of bores being provided in the top plate in the arm portion for receipt of a blocking member to hold the arm against the bias of the spring means in a position to which it has been moved wherein the top plate does not cover the vertical pin.

According to a second embodiment of the invention, the means for allowing pivotal movement of the arm about a vertical axis further includes the arm portion formed as a yoke having a pair of yoke arms, at least one lever member pivotally connected to the yoke arms at an intermediate portion of the lever member, and the lever member having one free end thereof in operative engagement with the support portion, and having the other free end thereof retaining the spring means while being slidable with respect to the spring means; the arm and arm portion being rigidly attached together. Access may readily be gained to the spring hooked end portion between the yoke arms for ready removal and insertion of the spring.

It is a primary object of the present invention to provide a simple mud-flap supporting assembly especially suitable for highway vehicles. This and other objects of the invention will become clear from an inspection of the detailed description of the invention, and from the appended claims.

BRIEF DESCRIPTION OF THE DRAWINGS

FIG. 1 is a side schematic view showing an exemplary assembly according to the present invention relating to a mud-flap on a vehicle;

FIG. 2 is a side view partly in cross-section and partly in elevation of the mounting detail of a first embodiment of the present invention;

FIG. 3 is a top plan view, with portions cut away for clarity, of the structure of FIG. 2, showing the structure in a break-away position in dotted line;

FIG. 4 is a side view, with portions cut away for clarity, of a second embodiment according to the present invention;

FIG. 5 is a top plan view of the structure of FIG. 4;

FIG. 6 is a perspective view of the embodiment of FIGS. 2 and 3 with portions cut away for clarity; and FIG. 7 is a perspective view of the embodiment of FIGS. 4 and 5 with portions cut away for clarity.

DETAILED DESCRIPTION OF THE DRAWINGS

A mud-flap supporting assembly according to the present invention is shown generally at 10 in FIG. 1, the assembly 10 for mounting a conventional mud-flap 12 on a vehicle 14, such as a truck, the flap 12 being located directly in back of a wheel or wheels of the truck. The assembly 10 includes a horizontally disposed mounting arm 16 adapted to have the mud-flap 12 attached thereto (as by a conventional depending flange arrangement 17), and means 18 for mounting the arm 16 to a vehicle at an attachment point A (see FIG. 2). The mounting means 18 includes means for substantially preventing movement of the arm 16 in a vertical direction and means for allowing pivotal movement of the arm 16 about a vertical axis V—V adjacent the attachment point A of the arm 16 to the vehicle 14. The means for allowing pivotal movement of the arm 16 about the axis V—V includes a removable vertical pin 20, an arm portion 22 for receipt of the pin 20, and a support portion 24 adapted to be connected to the vehicle 14 for receipt of the pin 20, the pin 20 passing through the arm portion 22 and support portion 24. Spring means 26 are also provided for operatively connecting the arm 16 and arm portion 22 for centering the arm 16 so that it is normally in a first position (as shown in solid line in FIG. 3, and as shown in FIG. 5) but may pivot against the spring bias about the axis V-V out of the first position, and so that it will be automatically returned by the spring means 26 to the first position. The means for preventing movement of the arm 16 in a vertical direction comprises interfering portions 27, 27' and 28, 28' of the arm portion 22 and support portion 24, respectively (see FIGS. 2 and 4).

One exemplary embodiment according to the present invention is shown in detail in FIGS. 2 and 3. In this embodiment the means for preventing movement of the arm 16 in a vertical direction also comprises telescopic portions 30, 31, for mounting arm 16 for horizontal telescopic movement thereof with respect to the arm portion 22 against the bias of the spring means 26, the telescopic member 31 being connected to the arm 16 and the telescopic member 30 being connected to the arm portion 22. The arm portion 22 comprises a yoke having spaced yoke arms 34 and a cross portion 35, the cross portion 35 having a slot 36 formed therein (see FIG. 3) for passage of a portion of the spring means (hooked end 58) into the area between the yoke arms. The arms 34 have vertically aligned bores therein for receipt of the pin 20 (see FIG. 2). The pin 20 may have an opening 37 formed in an exposed portion thereof for receipt of a padlock, spring keeper, or the like for latching the pin 20 in place. The support portion 24 has a bore therein cooperating with the bores in arms 34 for receipt of the pin 20 (see FIG. 2).

In the embodiment of FIGS. 2 and 3, the means for allowing pivotal movement of the arm 16 about the axis V—V further comprises a terminating portion 40 of the arm 16 which is biased into engagement with a portion of the support 24 by the spring means 26. The arm terminating portion 40 includes a top plate 42 that covers the pin 20 in the first position (solid line in FIG. 3) of the arm 16, but which does not cover the pin 20 when the arm is pivoted away from the first position (see dotted line position in FIG. 3). Stop means are provided for preventing complete separation of the arm 16 from the arm portion 22 should the spring means 26 break, such stop means preferably being provided by a raised portion 38 on the upper arm 34 of the arm portion 22, and a depending lip 39 formed on the bottom face of the plate 42 (see FIG. 2). A pair of bores 43, 44 are defined in the top plate 42 and upper yoke arm 34, respectively. The bores 43, 44 are adapted to receive a blocking member so that when the arm 16 is pivoted to a position wherein the plate 42 does not cover the pin 20, the blocking member can be inserted through the bores 43, 44 to hold the arm 16 and arm portion 22 in that position to allow removal of the pin 20. Preferably, the assembly is constructed so that the arm 16 can pivot in either angular direction about the axis V—V so that it will not be damaged by striking an object whether the vehicle is going forward or in reverse.

A second embodiment according to the present invention is shown in FIGS. 4 and 5. This embodiment differs primarily from the embodiment of FIGS. 2 and 3 in that the arm portion 22 is rigidly connected to the arm 16 (as by a weld 54 or the like—see FIG. 4). In this embodiment, the arm portion 22 also preferably comprises a yoke having a pair of yoke arms 34 and a cross portion 35, the cross portion with an opening (not shown) formed therein of passage of the spring means 26. The means for allowing pivotal movement of the arm 16 about the axis V—V in the FIGS. 4 and 5 embodiment includes at least one lever member 46 pivotally connected to the yoke arm 34 by pins 47 at an intermediate portion of the lever member 46. The member 46 has one free end 49 thereof in operative engagement with the support portion 24, and has another free end 50 thereof retaining the spring means while being slidable with respect to the spring means. The free end 49 of the lever 46 preferably comprises an arcuate portion in operative engagement with the support portion for facilitating pivotal movement of the lever about pins 47, such pivotal movement resulting in extension of the spring means 26. Preferably, a pair of lever member 46 are provided as shown in FIG. 5 (the end 49 of the front lever 46 being cut away in FIG. 4 for clarity) so that the arm 16—rigidly attached to the arm portion 22 by weld 54 or the like (see FIG. 4)—may pivot about the axis V—V whether the vehicle is going backward or forward.

The spring means 26 preferably comprises a coil spring having hook-shaped end portions 58 thereof. In the FIGS. 2 and 3 embodiment, one end portion 58 is disposed around a transverse pin 59 in the interior of the arm 16, while the other end 58 is received by a transverse pin 60 extending across the slot 36 and affixed to the yoke cross portion 35. In the FIGS. 4 and 5 embodiment a pin 59 associated with the arm 16 also is provided, with the other end 58 of the spring means 26 being received by the lever ends 50 as previously described. In either embodiment an opening may be formed in one of the generally horizontally extending portions thereof for receipt of the pin 20 when the arm 16 is removed from the vehicle 14 (such as the opening 62 in top yoke arm 34 of the FIG. 5 embodiment).

Assemblies according to the present invention having been described, an exemplary manner of operation thereof will now be set forth:

For the FIGS. 2 and 3 embodiment, one end 58 of the spring means 26 is passed through the slot 36 so that it engages the pin 60 while the other end 58 is free, and the yoke arms 34 are passed over the support portion 24 so that the bores therein are in alignment and the portions 27, 27'-28, 28' in interfering relationship. The pin 20 is then disposed through the bores and locked in place by a retainer in the opening 37. The arm 16 is then slipped over the arm portion 22, the telescoping segments 30, 31 thereof being in telescopic engagement, and the plate 42 extends so that it covers the pin 20. The stop portions 38, 39 are constructed to allow assembly in this manner (as by providing a cam portion on one end of the members 38, 39 but not on the other, or making the member 39 removable). Then the other end 58 of the spring means 26 is grasped and hooked over the pin 59, the structure then being in operative position. Upon receipt of a force having a horizontal vector H (see FIG. 3) in either direction, the arm 16 will pivot (such as is shown in FIG. 3 in dotted line) with the arm 16 being displaced horizontally from the arm portion 22 so that damage to the arm 16 does not result, the spring means 26 returning the arm 16 to the original position (solid line in FIG. 3) after the obstruction is passed. When removal of the arm 16 is desired, the arm 16 is merely moved manually to the position wherein the plate 42 does not cover the pin 20, (pivoted just past the dotted line position in FIG. 3 with the edge 42' of mounting arm 16 engaging the support 24) a blocking member is inserted in the bores 43, 44, and the pin removed. This procedure can be effected in reverse for assembly of the arm 16 in place, if desirable, and where access to the transverse pin 59 is difficult because of the construction of the device.

For the FIGS. 4 and 5 embodiment, when arm 16 and arm portion 22 are to be fastened to the vehicle, the spring end 58 between the yoke arms 34 is stretched out and the lever ends 50 pivoted so that they stop the end 58, the arms 34 are disposed over the support portion 24 so that the bores therein are aligned, and the pin 20 is inserted through the bores. Disassembly is effected merely by removing pin 20. Again, the arm 16 may pivot about the pin 20 in response to a horizontal force component in either direction to prevent damage to the arm 16, pivotal movement of the levers 46 effecting spring elongation during pivoting about the axis V—V, and the spring means 26 effecting return to the original position (see FIG. 5).

It will thus be seen that according to the present invention a mud-flap supporting assembly has been provided which is eminently suitable for highway use, not drooping from mud which may build up on the flap and preventing bouncing and shaking of the flap. The assembly is simple and easy to manufacture, repair, and attach in the field, without the use of special equipment, and allows for ready replacement of the spring biasing means. While the invention has been herein shown and described in what is presently conceived to be the most practical and preferred embodiments thereof, it will be apparent to those of ordinary skill in the art that many modifications may be made thereof within the scope of the invention, which scope is to be accorded the broadest interpretation of the appended claims so as to encompass all equivalent structures and devices.

What is claimed is:

1. A mud-flap supporting assembly, for mounting a mud-flap on a vehicle, comprising
    a horizontally disposed mounting arm adapted to have a mud-flap attached thereto;
    means for mounting said mounting arm to a vehicle at an attachment point, including means for substantially preventing movement of said arm in a vertical direction; and means for providing pivotal movement of said arm about a vertical axis adjacent the operative attachment point of the arm to the vehicle;
    said means for providing pivotal movement of said arm about a vertical axis including a vertical pin, an arm portion for receipt of said pin, and a support portion adapted to be connected to the vehicle for receipt of said pin, said pin passing through said arm portion and said support portion; and said means for substantially preventing movement of said arm in a vertical direction including interfering portions of said arm portion and said support portion; and
    spring means operatively connected between said arm and arm portion for centering said arm so that it is normally in a first position but may pivot against the bias of said spring means about said vertical axis out of the first position and so that it will be automatically returned by said spring means to the first position, said spring means consisting of a single coil spring having hook-shaped end portions each operatively engaging one of said arm and said arm portion.

2. A mud-flap supporting assembly, for mounting a mud-flap on a vehicle, comprising
    a horizontally disposed mounting arm adapted to have a mud-flap attached thereto;
    means for mounting said mounting arm to a vehicle at an attachment point, including means for substantially preventing movement of said arm in a vertical direction, and means for providing pivotal movement of said arm about a vertical axis adjacent the operative attachment point of the arm to the vehicle;
    said means for providing pivotal movement of said arm about a vertical axis including a vertical pin, an arm portion for receipt of said pin, and a support portion adapted to be connected to the vehicle for receipt of said pin, said pin passing through said arm portion and said support portion;
    spring means operatively connected between said arm and arm portion for centering said arm so that it is normally in a first position but may pivot against the bias of said spring means about said vertical axis out of the first position and so that it will be automatically returned by said spring means to the first position; and
    said means for preventing movement of said arm in a vertical direction comprising interfering portions of said arm portion and said support portion, and means for mounting said arm for horizontal telescopic movement thereof with respect to said arm portion against the bias of said spring means.

3. An assembly as recited in claim 1 wherein said preventing means further comprises means for mounting said arm for horizontal telescopic movement thereof with respect to said arm portion against the bias of said spring means.

4. An assembly as recited in claim 2 further comprising stop means for preventing complete separation of said arm from said arm portion should said spring means break.

5. An assembly as recited in claim 2 wherein said arm portion includes a yoke having a pair of arms and a cross-portion, and wherein said cross-portion has a slot formed therein for passage of a portion of said spring means into the area between said yoke arms, and wherein said yoke arms have vertically aligned bores for receipt of said vertical pin.

6. An assembly as recited in claim 2 wherein said means for allowing pivotal movement of said arm about a vertical axis further comprises a terminating portion of said arm biased into engagement with a portion of said support portion by said spring biasing means.

7. An assembly as recited in claim 6 wherein said arm terminating portion comprises a top plate portion that covers said vertical pin in the first position of said arm, but which does not cover said vertical pin when said arm is pivoted away from said first position; and wherein said assembly further comprises means defining a pair of bores in said top plate and in said arm portion for receipt of a blocking member to hold said arm against the bias of said spring means in a position to which it has been moved wherein the top plate does not cover said vertical pin.

8. An assembly as recited in claim 1 wherein said means for allowing pivotal movement of said arm about a vertical axis further includes said arm portion formed as a yoke having a pair of yoke arms, and at least one lever member pivotally connected to said yoke arms at an intermediate portion of said lever member, said lever member having one free end thereof in operative engagement with said support portion, and having another free end thereof retaining said spring means while being slidable with respect to said spring means.

9. An assembly as recited in claim 8 wherein said arm is rigidly connected to said arm portion at a terminal end of said arm.

10. An assembly as recited in claim 8 wherein said one free end of said lever comprises an arcuate portion in operative engagement with said support portion.

11. An assembly as recited in claim 8 wherein said pivotal movement allowing means comprises two lever members, each pivotally connected to said yoke arms and in operative engagement with said support portion and in slidable retaining engagement with said spring means.

12. An assembly as recited in claim 2 wherein said spring means consists of a single coil spring having hook-shaped end portions.

* * * * *